United States Patent
Naito et al.

(10) Patent No.: US 9,300,475 B2
(45) Date of Patent: Mar. 29, 2016

(54) SIGNATURE GENERATION BY CALCULATING A REMAINDER MODULO PUBLIC INFORMATION

(75) Inventors: Yusuke Naito, Tokyo (JP); Yasuyuki Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 334 days.

(21) Appl. No.: 13/824,577

(22) PCT Filed: Dec. 24, 2010

(86) PCT No.: PCT/JP2010/073422
§ 371 (c)(1),
(2), (4) Date: Mar. 18, 2013

(87) PCT Pub. No.: WO2012/086076
PCT Pub. Date: Jun. 28, 2012

(65) Prior Publication Data
US 2013/0179691 A1    Jul. 11, 2013

(51) Int. Cl.
*H04L 9/32* (2006.01)
(52) U.S. Cl.
CPC .................... *H04L 9/3252* (2013.01)
(58) Field of Classification Search
CPC ............... H04L 9/3252; G06F 7/725
USPC ......................................... 713/176
See application file for complete search history.

(56) References Cited

U.S. PATENT DOCUMENTS 5,991,415 A * 11/1999 Shamir .................. G06F 7/723
                                                          380/1
6,088,798 A *  7/2000 Shimbo ................. H04L 9/3066
                                                          380/30

(Continued)

FOREIGN PATENT DOCUMENTS

| JP | 2002 268548 | 9/2002 |
| JP | 2004 531762 | 10/2004 |
| JP | 2010 277006 | 12/2010 |

OTHER PUBLICATIONS

"Information technology—Security techniques—Digital signatures with appendix—Part 3: Discrete logarithm based mechanisms—Amendment 1: Elliptic Curve Russian Digital Signature Algorithm, Schnorr Digital Signature Algorithm, Elliptic Curve Schnorr Digital Signature Algorithm, Elliptic Curve Full Schnorr Digital Signature Algorithm," ISO/IEC JTC 1/SC 27 N8181, Project Co-editors (A. Chmora, A. Lunin), Total 36 Pages, (Dec. 15, 2009).

(Continued)

*Primary Examiner* — Farid Homayounmehr
*Assistant Examiner* — Lizbeth Torres-Diaz
(74) *Attorney, Agent, or Firm* — Oblon, McClelland, Maier & Neustadt, L.L.P.

(57) ABSTRACT e and n are public information and d is private information. An electronic signature is generated based on a calculated value of e×d mod n. A signature generation apparatus includes a random number generation unit, a first calculation unit, a second calculation unit, and a signature generation unit. The random number generation unit generates a random number r. The first calculation unit calculates s1=r×n. The second calculation unit calculates s2=s1+e. The signature generation unit calculates s3=s2×d mod n and outputs s3 as the calculated value of e×d mod n. The signature generation apparatus can thereby generate the above electronic signature securely against differential power attacks.

6 Claims, 4 Drawing Sheets

(56) References Cited

U.S. PATENT DOCUMENTS

| | | | |
|---|---|---|---|
| 6,243,467 B1* | 6/2001 | Reiter | G06F 7/725 380/30 |
| 6,304,658 B1* | 10/2001 | Kocher | G06F 7/723 380/28 |
| 2003/0235300 A1* | 12/2003 | Solinas | H04L 9/0866 380/30 |
| 2004/0179680 A1 | 9/2004 | Liardet et al. | |
| 2010/0310066 A1* | 12/2010 | Joye | G06F 7/725 380/28 |
| 2012/0099725 A1* | 4/2012 | Sakazaki | G06F 21/73 380/28 |

OTHER PUBLICATIONS

Coron, Jean-Sebastien, "Resistance against Differential Power Analysis for Elliptic Curve Cryptosystems," CHES '99, LNCS 1717, pp. 292 to 302, (1999).

International Search Report Issued Feb. 1, 2011 in PCT/JP10/73422 Filed Dec. 24, 2010.

* cited by examiner

SIGNATURE GENERATION BY CALCULATING A REMAINDER MODULO PUBLIC INFORMATION

TECHNICAL FIELD

The present invention relates to a signature generation apparatus, a signature generation method, and a storage medium.

BACKGROUND ART

An electronic signature is generated by using a private key of the signer (refer to Non-Patent Literature 1). A private key is data that no one else but the signer knows. If the private key is revealed, the signature can be forged.

When an electronic signature is calculated, a step of performing multiplication of public information and private information (e.g., a private key) occurs. The private information can be obtained by performing differential power analysis on the multiplication of the public information and the private information while referring to the public information (refer to Non-Patent Literature 2).

For example, an EC-Schnorr signature algorithm (Elliptic Curve Schnorr Digital Signature Algorithm) is as the following:

Step 0. Let G be a generator on an elliptic curve and n an order of G. Let d be a private key, M a message to be signed, and h a hash function.
Step 1. Generate a random number k. k is a natural number less than n.
Step 2. Calculate P=kG and let Px be an x coordinate of P.
Step 3. Calculate e=h(M||Px). "||" signifies concatenation.
Step 4. Calculate s=(e×d+k)mod n.
Step 5. (e, s) will be the electronic signature of M.

In the above calculation method, calculation of e×d is performed in Step 4. Since e is public information, the private key d can be obtained by performing differential power analysis.

For example, EC-DSA (Elliptic Curve Digital Signature Algorithm) is as the following:

Step 0. Let G be a generator on an elliptic curve and n an order of G. Let d be a private key, M a message to be signed, and h a hash function.
Step 1. Generate a random number k. k is a natural number less than n.
Step 2. Calculate P=kG and let Px be an x coordinate of P.
Step 3. Calculate s=k$^{-1}$(Px×d+h(M))mod n.
Step 4. (Px, s) will be the electronic signature of M.

In the above calculation method, calculation of Px×d is performed in Step 4. Since Px is public information, the private key d can be obtained by performing differential power analysis.

CITATION LIST

Non-Patent Literature

Non-Patent Literature 1: ISO/IEC 14888-3:2006/FDAM 1, "Information technology—Security techniques—Digital signatures with appendix—Part 3: Discrete logarithm based mechanisms—Amendment 1: Elliptic Curve Russian Digital Signature Algorithm, Schnorr Digital Signature Algorithm, Elliptic Curve Schnorr Digital Signature Algorithm, Elliptic Curve Full Schnorr Digital Signature Algorithm", ISO/IEC JTC 1/SC 27, 2009-12-15

Non-Patent Literature 2: Jean-Sebastien Coron, "Resistance against Differential Power Analysis for Elliptic Curve Cryptosystems", CHES '99, LNCS 1717, pp. 292-302, 1999

SUMMARY OF INVENTION

Technical Problem

In the examples described above, anyone who knows d can create a signature. That is, when the private key is given to someone else, a signature can be forged. In the conventional calculation method, however, the private key can easily be acquired by performing differential power analysis. If the private key is revealed similarly by performing differential power analysis on computation of an electronic signature such as a Schnorr signature and a DSA (Digital Signature Algorithm) signature in addition to an EC-Schnorr signature and an EC-DSA signature, the signature can be forged.

The present invention aims, for example, to generate an electronic signature securely against differential power attacks.

Solution to Problem

A signature generation apparatus according to one aspect of the present invention is a signature generation apparatus which generates an electronic signature obtainable by calculating a remainder modulo public information n for a result of computation which includes multiplication of public information e and private information d. The signature generation apparatus includes:

an input unit configured to input the public information e and n;

a read unit configured to read the private information d from a memory device which beforehand stores the private information d;

a first calculation unit configured to perform, using a processing device, multiplication M1 of new private information r and the public information n inputted by the input unit;

a second calculation unit configured to perform, using the processing device, addition M2 of a result of the multiplication M1 performed by the first calculation unit and the public information e inputted by the input unit; and a signature generation unit configured to generate the electronic signature by performing as the computation, using the processing device, computation C which includes multiplication of a result of the addition M2 performed by the second calculation unit and the private information d read by the read unit, and calculating, using the processing device, a remainder modulo the public information n inputted by the input unit for a result of the computation C.

Advantageous Effects of Invention

According to one aspect of the present invention, computation of an electronic signature such as an EC-Schnorr signature, a Schnorr signature, an EC-DSA signature, and a DSA signature can be performed securely against differential power attacks.

DESCRIPTION OF EMBODIMENTS

In the following, embodiments of the present invention will be explained in reference to the figures.

Embodiment 1

The present embodiment can be applied to generation of an electronic signature obtainable by calculating a remainder modulo public information n (i.e., t mod n) for the result t of computation C which includes multiplication of public information e and private information d (i.e., e×d). Such electronic signatures include an EC-Schnorr signature, a Schnorr signature, an EC-DSA signature, a DSA signature, etc. In the present embodiment, a calculation method is devised so that the multiplication of the public information e and the private information d is not directly performed when generating such electronic signatures.

Figure 1:
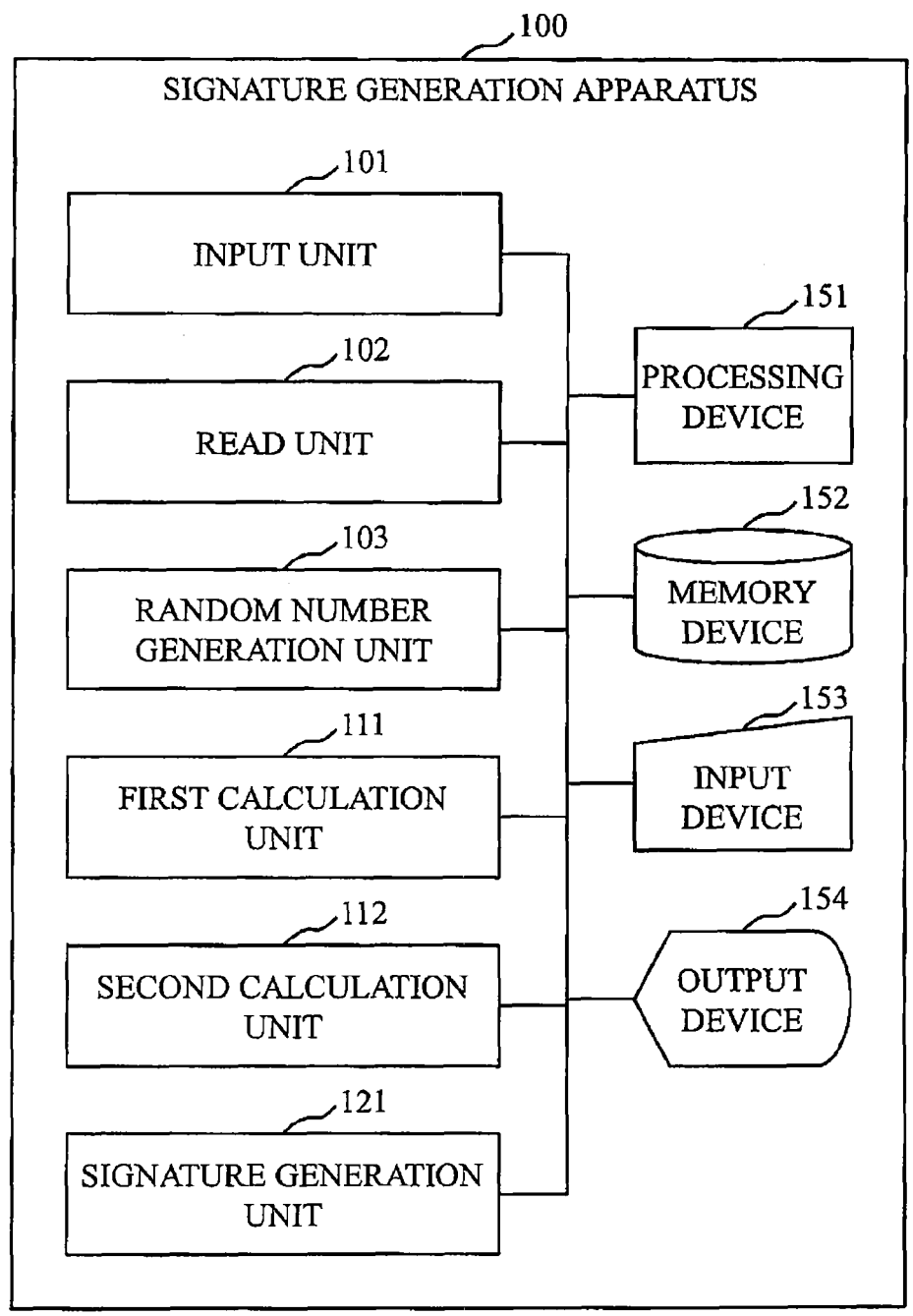
FIG. 1 a block diagram showing a configuration of a signature generation apparatus according to the first and the second embodiments.

FIG. 1 is a block diagram showing a configuration of a signature generation apparatus 100 according to the present embodiment.

In FIG. 1, the signature generation apparatus 100 includes an input unit 101, a read unit 102, a random number generation unit 103, a first calculation unit 111, a second calculation unit 112, and a signature generation unit 121. Behavior of each unit of the signature generation apparatus 100 will be described later.

The signature generation apparatus 100 includes hardware such as a processing device 151, a memory device 152, an input device 153, and an output device 154. Hardware is used by each unit of the signature generation apparatus 100. For example, the processing device 151 is used for computing, processing, reading, writing, etc. of data and information in each unit of the signature generation apparatus 100. The memory device 152 is used for storing the data and information. The input device 153 is used for inputting the data and information. The output device 154 is used for outputting the data and information.

Figure 2:
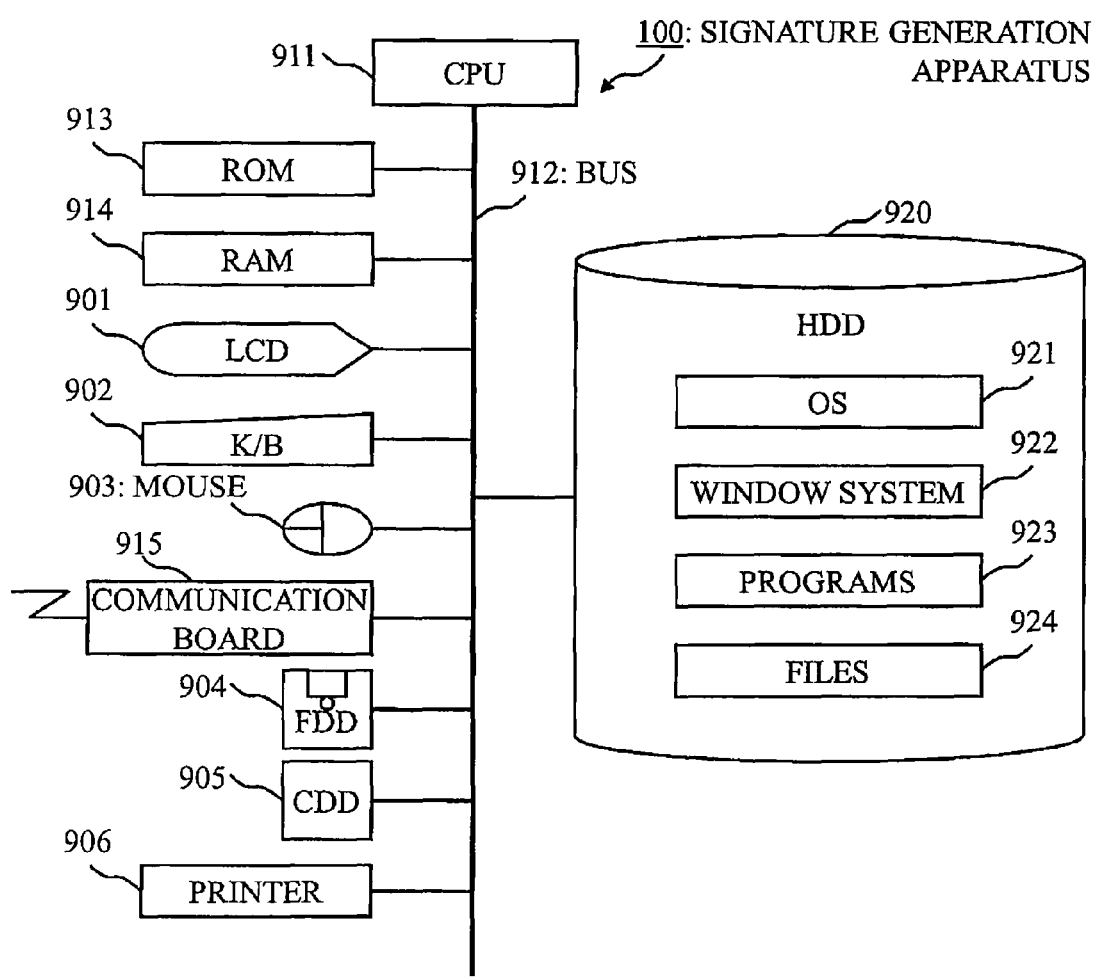
FIG. 2 a diagram showing an example of a hardware configuration of the signature generation apparatus according to the first and the second embodiments.

FIG. 2 is a diagram showing an example of a hardware configuration of the signature generation apparatus 100.

In FIG. 2, the signature generation apparatus 100 is a computer and includes hardware devices such as an LCD 901 (Liquid Crystal Display), a keyboard 902 (K/B), a mouse 903, an FDD 904 (Flexible Disk Drive), a CDD 905 (Compact Disc Drive), and a printer 906. These hardware devices are connected by cables or signal lines. Instead of the LCD 901, a CRT (Cathode Ray Tube) or another display device may be used. Instead of the mouse 903, a touch panel, a touch pad, a trackball, a graphics tablet, or another pointing device may be used.

The signature generation apparatus 100 includes a CPU 911 (Central Processing Unit) for executing programs. The CPU 911 is an example of the processing device 151. The CPU 911 is connected, via a bus 912, to a ROM 913 (Read Only Memory), a RAM 914 (Random Access Memory), a communication board 915, the LCD 901, the keyboard 902, the mouse 903, the FDD 904, the CDD 905, the printer 906, and an HDD 920 (Hard Disk Drive), and controls these hardware devices. Instead of the HDD 920, a flash memory, an optical disc drive, a memory card reader/writer, or another storage medium may be used.

The RAM 914 is an example of a volatile memory. The ROM 913, the FDD 904, the CDD 905, and the HDD 920 are examples of a non-volatile memory. These are examples of the memory device 152. The communication board 915, the keyboard 902, the mouse 903, the FDD 904, and the CDD 905 are examples of the input device 153. Further, the communication board 915, the LCD 901, and the printer 906 are examples of the output device 154.

The communication board 915 is connected to a LAN (Local Area Network), etc. The communication board 915 may be connected not only to the LAN, but also to a WAN (Wide Area Network) such as an IP-VPN (Internet Protocol Virtual Private Network), a wide-area LAN, and an ATM (Asynchronous Transfer Mode) network, or to the Internet. The LAN, the WAN, and the Internet are examples of a network.

The HDD 920 stores an operating system 921 (OS), a window system 922, programs 923, and files 924. Each program of the programs 923 is executed by the CPU 911, the operating system 921, and the window system 922. The programs 923 include a program implementing functions each explained as " . . . unit" in the explanation of the present embodiment. The program is read out and executed by the CPU 911. The files 924 include data, information, signal values, variable values, and parameters, which are explained as " . . . data", " . . . information", " . . . ID (identifier)", " . . . flag", or " . . . result" in the explanation of the present embodiment, are included as items of " . . . file", " . . . database", and " . . . table". " . . . file", " . . . database", and " . . . table" are stored in a storage medium such as the RAM 914 and the HDD 920. The data, the information, the signal values, the variable values, and the parameters stored in the storage medium such as the RAM 914 and the HDD 920 are read out by the CPU 911 via a read/write circuit to a main memory or a cache memory and used for processing (operation) of the CPU 911 such as extraction, search, reference, comparison, computation, calculation, control, output, printing, and displaying. During the processing of the CPU 911 such as extraction, search, reference, comparison, computation, calculation, control, output, printing, and displaying, the data, the information, the signal values, the variable values, or the parameters are temporarily stored in the main memory, the cache memory, or a buffer memory.

An arrow part in block diagrams or flowcharts used for the explanation of the present embodiment mainly shows an input/output of data or signals. The data or the signals are stored in a memory such as the RAM 914, in a flexible disk (FD) of the FDD 904, in a compact disc (CD) of the CDD 905, in a magnetic disk of the HDD 920, in an optical disc, in a DVD (Digital Versatile Disc) or in another storage medium. Further, the data or the signals are transmitted by the bus 912, the signal lines, the cables, or another transmission medium.

What is explained as " . . . unit" in the explanation of the present embodiment may be " . . . circuit", " . . . device", or " . . . equipment", and may also be " . . . step", " . . . process", " . . . procedure", or " . . . processing". That is, what is explained as " . . . unit" may be implemented by firmware stored in the ROM 913. Or, what is explained as " . . . unit" may also be implemented by only software or only hardware such as elements, devices, boards, wirings. Or, what is explained as " . . . unit" may be implemented by a combination of software and hardware, or a combination of software, hardware, and firmware. Firmware and software are stored in the storage medium such as the flexible disk, the compact disc, the magnetic disk, the optical disc, the DVD, as programs. The programs are read out by the CPU 911 and executed by the CPU 911. That is, the programs are to function a computer as " . . . unit" described in the explanation of the present embodiment. Or, the programs are to have the computer execute a procedure or a method of " . . . unit" described in the explanation of the present embodiment.

Figure 3:
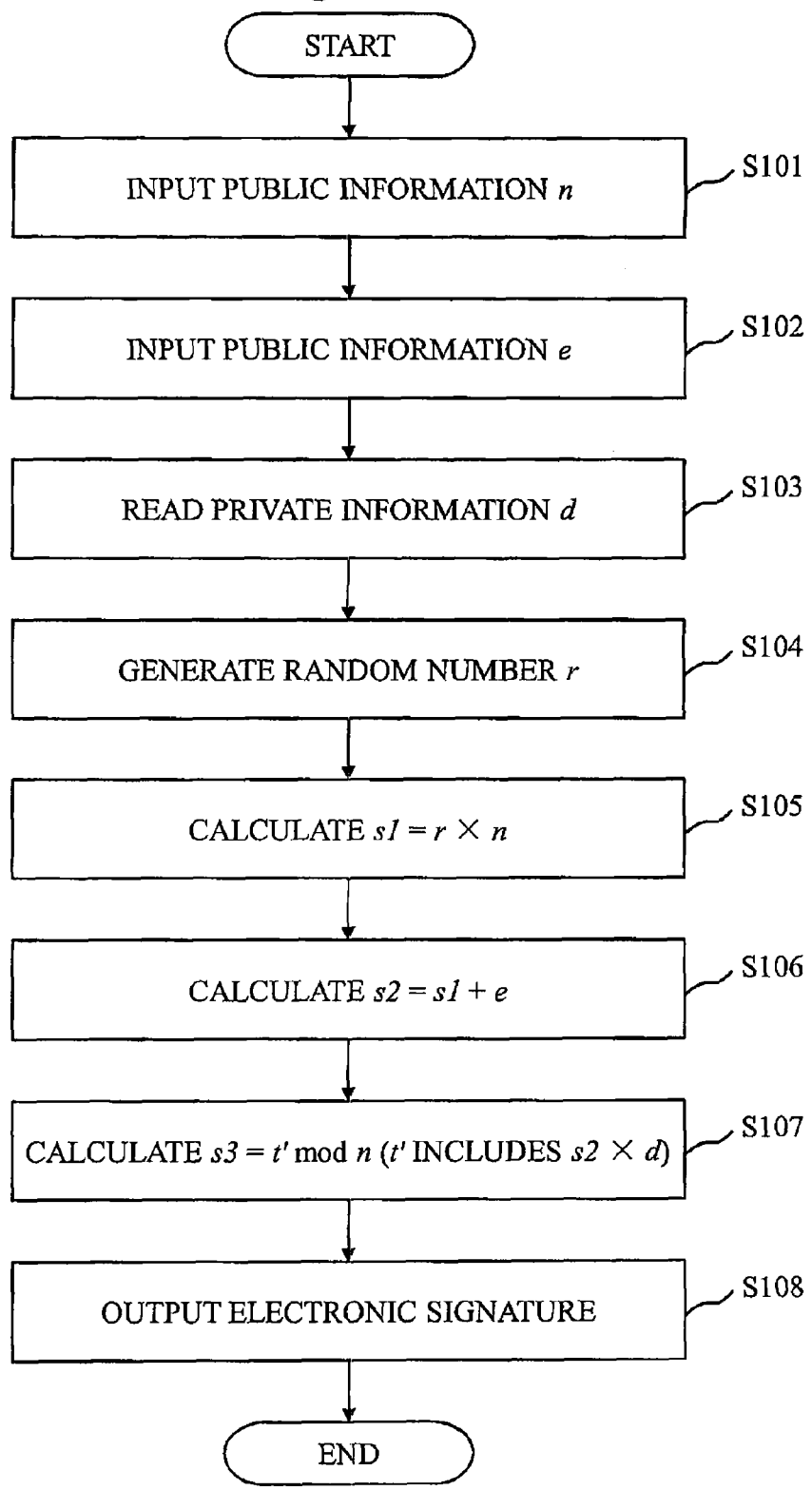
FIG. 3 a flowchart showing behavior of the signature generation apparatus according to the first embodiment.

FIG. 3 is a flowchart showing behavior of the signature generation apparatus 100 (i.e., the signature generation method according to the present embodiment).

In Step S101, the input unit 101 inputs the public information n. For example, the input unit 101 reads the public information n from the memory device 152 and inputs the read public information n. The input unit 101 may receive, using the input device 153, the public information n from outside of the signature generation apparatus 100, and input the received public information n. Or, the input unit 101 may calculate the public information n using the processing device 151 and input the calculated public information n.

In Step S102, the input unit 101 inputs the public information e. For example, the input unit 101 calculates the public information e using the processing device 151 and inputs the calculated public information e. The input unit 101 may read the public information e from the memory device 152 and input the read public information e. Or, the input unit 101 may receive, using the input device 153, the public information e from outside of the signature generation apparatus 100, and input the received public information e.

In Step S103, the read unit 102 reads the private information d from the memory device 152. In the memory device 152, the private information d is stored beforehand. For example, the private information d is inputted by the input unit 101 and stored in the memory device 152.

In Step S104, the random number generation unit 103 generates a random number r as new private information r.

The order and/or the timing of processing Steps S101 to S104 may arbitrarily be changed.

In Step S105, the first calculation unit 111 performs, using the processing device 151, multiplication M1 of the random number r generated by the random number generation unit 103 and the public information n inputted by the input unit 101. That is, the first calculation unit 111 calculates s1=r×n.

In Step S106, the second calculation unit 112 performs, using the processing device 151, addition M2 of the result s1 of the multiplication M1 performed by the first calculation unit 111 and the public information e inputted by the input unit 101. That is, the second calculation unit 112 calculates s2=s1+e.

In Step S107, the signature generation unit 121 performs as the computation C described previously, using the processing device 151, computation C' which includes multiplication of the result s2 of the addition M2 performed by the second calculation unit 112 and the private information d read by the read unit 102 (i.e., s2×d). Then, the signature generation unit 121 calculates, using the processing device 151, a remainder modulo the public information n inputted by the input unit 101 for the result t' of the computation C'. That is, the signature generation unit 121 calculates s3=t' mod n. The combination of s3 and the information for signature verification (e.g., the public information e) will be the electronic signature.

In Step S108, the signature generation unit 121 outputs the electronic signature generated in Step S107. For example, the signature generation unit 121 gives the generated electronic signature to an arbitrary application program. Or, for example, the signature generation unit 121 sends, using the output device 154, the generated electronic signature outside of the signature generation apparatus 100.

In Step S107, consequently, calculation of (r×n+e)×d is performed as at least a part of the computation C'. Since calculation of e×d does not appear as it does in the computation C, d is never to be obtained by differential power analysis. Therefore, the electronic signature can be generated securely against differential power attacks.

To simplify the present embodiment, it can be said that the signature generation apparatus 100 performs the computation of e×d mod n as the following:

Step 1. Generate a random number r.
Step 2. Calculate s1=r×n.
Step 3. Calculate s2=s1+e.
Step 4. Calculate s3=s2×d mod n.
Step 5. Output s3 as the calculated value of e×d mod n In the above calculation method, calculation of (r×n+e)×d is performed instead of calculation of e×d in Step 4. However, since the r×n portion is equal to 0 in calculation of mod n, the same result can be obtained as the calculation of e×d. Therefore, the calculated value of e×d mod n can be obtained securely against differential power attacks.

In the following, the first application example of the present embodiment will be explained in reference to FIG. 3. In the present example, the signature generation apparatus 100 generates an EC-Schnorr signature as the electronic signature.

In Step S101, the input unit 101 inputs an order n of a generator G on an elliptic curve as the public information n.

In the present example, the random number generation unit 103 generates a random number k before Step S102. k is a natural number less than n.

In Step S102, the input unit 101 calculates, using the processing device 151, a scalar product P of the random number k generated by the random number generation unit 103 and the generator G on the elliptic curve. That is, the input unit 101 calculates P=kG. Next, the input unit 101 concatenates a message M to which the electronic signature is to be attached and an x coordinate value of the scalar product P (i.e., Px), and converts, using the processing device 151, the message M and the x coordinate value which are concatenated to a hash value. Then, the input unit 101 inputs the hash value as the public information e. That is, the input unit 101 calculates e=h(M||Px).

In Step S103, the read unit 102 reads a private key d as the private information d from the memory device 152.

In Step S104, the random number generation unit 103 generates a random number r separately from the random number k. r is a natural number.

In Step S105, the first calculation unit 111 performs, using the processing device 151, multiplication M1 of the random number r generated by the random number generation unit 103 and the order n inputted by the input unit 101. That is, the first calculation unit 111 calculates s1=r×n.

In Step S106, the second calculation unit 112 performs, using the processing device 151, addition M2 of the result s1 of the multiplication M1 performed by the first calculation unit 111 and the public information e inputted by the input unit 101. That is, the second calculation unit 112 calculates s2=s1+e.

In Step S107, the signature generation unit 121 performs, using the processing device 151, multiplication M3 of the result s2 of the addition M2 performed by the second calculation unit 112 and the private key d read by the read unit 102. Then, the signature generation unit 121 performs, using the processing device 151, addition M4 of the result of the multiplication M3 and the random number k generated by the random number generation unit 103. The result of the addition M4 will be the result t' of the computation C'. That is, the signature generation unit 121 calculates t'=s2×d+k. Next, the signature generation unit 121 calculates, using the processing device 151, a remainder modulo the order n inputted by the input unit 101 for the result t' of the computation C'. That is, the signature generation unit 121 calculates s3=t' mod n. The combination of s3 and the public information e will be the electronic signature. That is, (e, s3) will be the electronic signature of M.

In Step S107, the signature generation unit 121 may, before using the result of the multiplication M3 in the addition M4, calculate a remainder modulo the order n for the result of the multiplication M3, and replace the result of the multiplication M3 with the remainder. That is, the signature generation unit 121 may calculate (s2×d mod n)+k instead of t'=s2×d+k.

In Step S108, the signature generation unit 121 outputs the electronic signature generated in Step S107.

In Step S107, consequently, calculation of (r×n+e)×d+k is performed as the computation C'. Since calculation of e×d does not appear as it does in the computation C, d is never to be obtained by differential power analysis. Therefore, the electronic signature can be generated securely against differential power attacks.

In the present example, the signature generation apparatus 100 performs the computation of (e×d+k)mod n of Step 4 shown in the explanation of the EC-Schnorr signature algorithm, as the following;
Step 4-1. Generate a random number r.
Step 4-2. Calculate s1=r×n.
Step 4-3. Calculate s2=s1+e.
Step 4-4. Calculate s3=(s2×d+k)mod n.
Step 4-5. Output s3 as the calculated value of (e×d+k)mod n.

In the above calculation method, calculation of (r×n+e)×d is performed instead of calculation of e×d in Step 4-4. Therefore, the calculated value of (e×d+k) mod n can be obtained securely against differential power attacks. The same calculation method as the one described above can be used for computation of a Schnorr signature.

In the following, the second application example of the present embodiment will be explained in reference to FIG. 3. In the present example, the signature generation apparatus 100 generates an EC-DSA signature as the electronic signature.

In Step S101, the input unit 101 inputs an order n of a generator G on an elliptic curve as the public information n.

In the present example, the random number generation unit 103 generates a random number k before Step S102. k is a natural number less than n.

In Step S102, the input unit 101 calculates, using the processing device 151, a scalar product P of the random number k generated by the random number generation unit 103 and the generator G on the elliptic curve. That is, the input unit 101 calculates P=kG. Then, the input unit 101 inputs an x coordinate value of the scalar product P (i.e., Px) as the public information e.

In Step S103, the read unit 102 reads a private key d as the private information d from the memory device 152.

In Step S104, the random number generation unit 103 generates a random number r separately from the random number k. r is a natural number.

In Step S105, the first calculation unit 111 performs, using the processing device 151, multiplication M1 of the random number r generated by the random number generation unit 103 and the order n inputted by the input unit 101. That is, the first calculation unit 111 calculates s1=r×n.

In Step S106, the second calculation unit 112 performs, using the processing device 151, addition M2 of the result s1 of the multiplication M1 performed by the first calculation unit 111 and Px inputted by the input unit 101. That is, the second calculation unit 112 calculates s2=s1+Px.

In Step S107, the signature generation unit 121 performs, using the processing device 151, multiplication M3 of the result s2 of the addition M2 performed by the second calculation unit 112 and the private key d read by the read unit 102. The signature generation unit 121 performs, using the processing device 151, addition M4 of the result of the multiplication M3 and a hash value h(M) of a message M to which the electronic signature is to be attached. Then, the signature generation unit 121 performs, using the processing device 151, multiplication M5 of the result of the addition M4 and an inverse number $k^{-1}$ of the random number k generated by the random number generation unit 103. The result of the multiplication M5 will be the result t' of the computation C'. That is, the signature generation unit 121 calculates $t'=k^{-1}$(s2×d+h(M)). Next, the signature generation unit 121 calculates, using the processing device 151, a remainder modulo the order n inputted by the input unit 101 for the result t' of the computation C'. That is, the signature generation unit 121 calculates s3=t' mod n. The combination of s3 and Px will be the electronic signature. That is, (Px, s3) will be the electronic signature of M.

In Step S107, the signature generation unit 121 may, before using the result of the multiplication M3 in the addition M4, calculate a remainder modulo the order n for the result of the multiplication M3, and replace the result of the multiplication M3 with the remainder. Similarly, the signature generation unit 121 may, before using the result of the addition M4 in the multiplication M5, calculate a remainder modulo the order n for the result of the addition M4, and replace the result of the addition M4 with the remainder. That is, the signature generation unit 121 may calculate $t'=k^{-1}$((s2×d mod n)+h(M)), $t'=k^{-1}$((s2×d+h(M))mod n), or $t'=k^{-1}$(((s2×d mod n)+h(M)) mod n) instead of $t'=k^{-1}$(s2×d+h(M)).

In Step S108, the signature generation unit 121 outputs the electronic signature generated in Step S107.

In Step S107, consequently, calculation of $k^{-1}$((r×n+Px)× d+h(M)) is performed as the computation C'. Since calculation of Px×d does not appear as it does in the computation C, d is never to be obtained by differential power analysis. Therefore, the electronic signature can be generated securely against differential power attacks.

In the present example, the signature generation apparatus 100 performs the computation of $k^{-1}$(Px×d+h(M))mod n of Step 4 shown in the explanation of the EC-DSA, as the following:
Step 4-1. Generate a random number r.
Step 4-2. Calculate s1=r×n.
Step 4-3. Calculate s2=s1+Px.
Step 4-4. Calculate s3=$k^{-1}$(s2×d+h(M))mod n.
Step 4-5. Output s3 as the calculated value of $k^{-1}$(Px×d+h (M))mod n.

In the above calculation method, calculation of (r×n+ Px)×d is performed instead of calculation of Px×d in Step 4-4. Therefore, the calculated value of $k^{-1}$(Px×d+h(M))mod n can be obtained securely against differential power attacks. The same calculation method as the one described above can be used for computation of a DSA signature.

Embodiment 2

The present embodiment, mainly differences from the first embodiment, will be explained.

The configuration of the signature generation apparatus 100 according to the present embodiment is the same as that of the first embodiment shown in FIG. 1.

Figure 4:
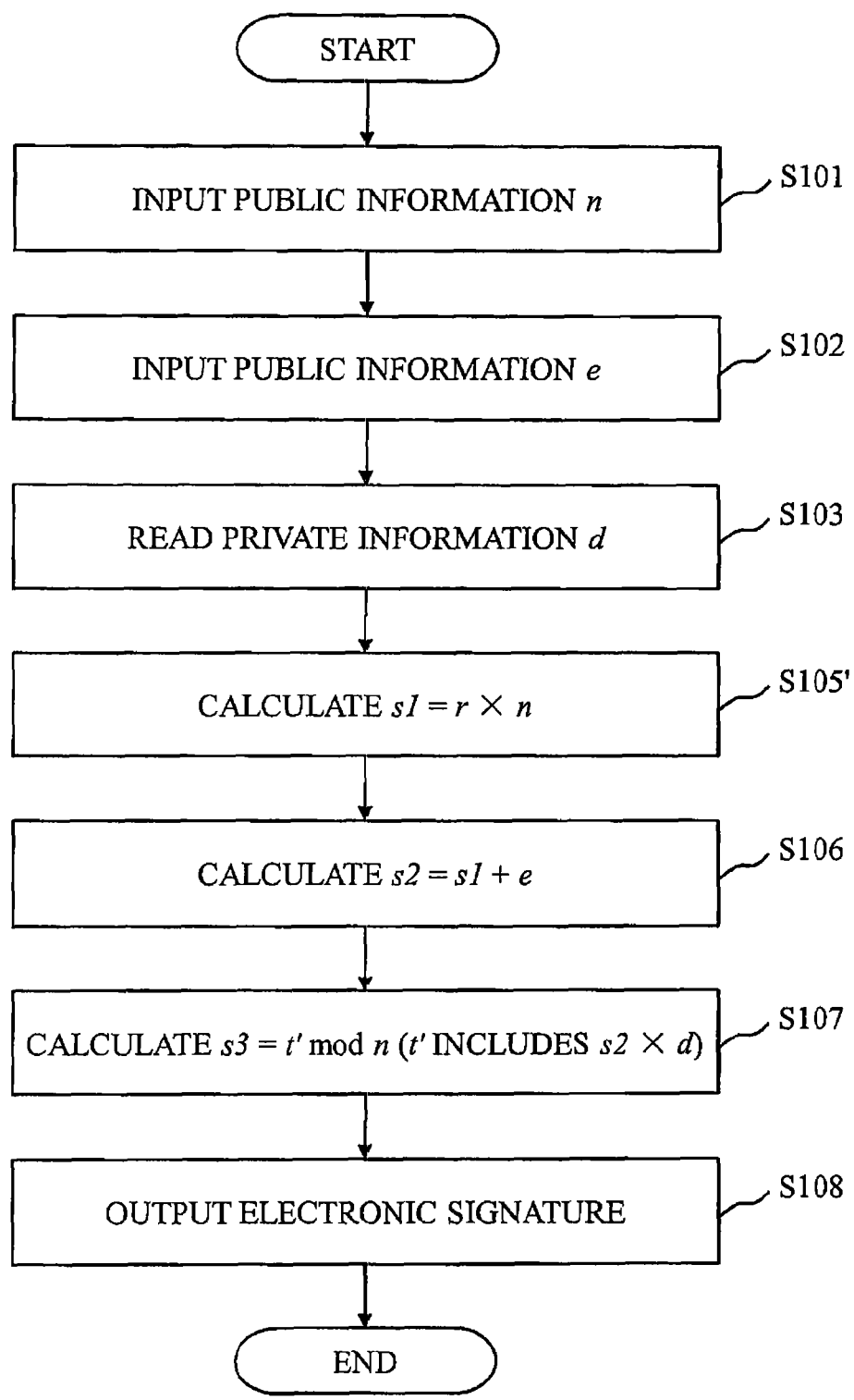
FIG. 4 a flowchart showing behavior of the signature generation apparatus according to the second embodiment.

FIG. 4 is a flowchart showing behavior of the signature generation apparatus 100 (i.e., the signature generation method according to the present embodiment).

In the present embodiment, Step S104 shown in FIG. 3 is omitted and Step S105 is replaced with Step S105'. In Step S105', the first calculation unit 111 uses a value calculated during a process of generating information to be used in the computation C' (e.g., the public information e), as new private information r.

According to the present embodiment, processing time can be shortened because the process of generating random number r, as in Step S104 of the first embodiment, is unnecessary.

In the following, the first application example of the present embodiment will be explained in reference to FIG. 4. In the present example, the signature generation apparatus 100 generates an EC-Schnorr signature as the electronic signature, as it does in the first application example of the first embodiment.

Steps S101 to S103 are the same as those of the first application example of the first embodiment.

In Step S105', the first calculation unit 111 uses the x coordinate value of the scalar product P (i.e., Px) calculated by the input unit 101, as the new private information r. That is, the first calculation unit 111 performs, using the processing device 151, multiplication M1 of Px and the order n inputted by the input unit 101.

In Step S105', the first calculation unit 111 may use only a part of Px, as the new private information r. For example, if Px is 160-bit data, the first calculation unit 111 may use only the upper 100-bit data, the lower 20-bit data, or other arbitrary bits of data out of Px, as the new private information r. Or, the first calculation unit 111 may use a y coordinate value of the scalar product P (i.e., Py) calculated by the input unit 101, as the new private information r. The first calculation unit 111 may use only a part of Py, as the new private information r. The first calculation unit 111 may use both of Px and Py, as the new private information r. That is, the first calculation unit 111 may use at least a part of either Px or Py, as the new private information r. Or, the first calculation unit 111 may use a value obtained during a process of calculating the scalar product P by the input unit 101, as the new private information r. For example, if the input unit 101 performs computation of adding the generator G on the elliptic curve as a loop of k times in Step S102, the first calculation unit 111 may use any calculated value obtained at the $j^{th}$ time (j<k) of the loop, as the new private information r.

Steps S106 to S108 are the same as those of the first application example of the first embodiment.

As described above, in the present example, P or a part of P is used instead of the random number r in the first application example of the first embodiment. Since P is a k multiple of G where k is a random number, P can be considered a random number. The same method as the one described above can be used for computation of a Schnorr signature.

In the following, the second application example of the present embodiment will be explained in reference to FIG. 4. In the present example, the signature generation apparatus 100 generates an EC-DSA signature as the electronic signature, as it does in the second application example of the first embodiment.

Steps S101 to S103 are the same as those in the second application example of the first embodiment.

Step S105' is the same as that of the first application example of the present embodiment.

Steps S106 to S108 are the same as those in the second application example of the first embodiment.

As described above, in the present example, P or a part of P is used instead of the random number r in the second application example of the first embodiment, as in the first application example. Since P is a k multiple of G where k is a random number, P can be considered a random number, as in the first application example. The same method as the one described above can be used for computation of a DSA signature.

REFERENCE SIGNS LIST

100: signature generation apparatus
101: input unit
102: read unit
103: random number generation unit
111: first calculation unit
112: second calculation unit
121: signature generation unit
151: processing device
152: memory device
153: input device
154: output device
901: LCD
902: keyboard
903: mouse
904: FDD
905: CDD
906: printer
911: CPU
912: bus
913: ROM
914: RAM
915: communication board
920: HDD
921: operating system
922: window system
923: programs
924: files

The invention claimed is:

1. A signature generation apparatus which generates an electronic signature obtainable by calculating a remainder modulo public information n for a result of computation C which includes multiplication of public information e and private information d, the signature generation apparatus comprising:

an input logic configured to input the public information e and n;

a read logic configured to read the private information d from a memory device which beforehand stores the private information d;

a first calculation logic configured to perform, using a hardware processing device, multiplication M1 of new private information r and the public information n inputted by the input logic;

a second calculation logic configured to perform, using the hardware processing device, addition M2 of a result of the multiplication M1 performed by the first calculation logic and the public information e inputted by the input logic;

a signature generation logic configured to generate the electronic signature by performing as the computation C, using the hardware processing device, computation C' which includes multiplication of a result of the addition M2 performed by the second calculation logic and the private information d read by the read logic, and calculating, using the hardware processing device, a remainder modulo the public information n inputted by the input logic for a result of the computation C'; and a random number generation logic configured to generate, using the processing device, a random number k, wherein the electronic signature is an ECDSA (Elliptic Curve Digital Signature Algorithm) signature, the input logic calculates a scalar product P of the random number k generated by the random number generation logic and a generator G on an elliptic curve, and inputs an x coordinate value of the scalar product P as the public information e, and the signature generation logic performs multiplication M3 of the result of the addition M2 performed by the second calculation logic and the private information d read by the read logic, performs addition M4 of a result of the multiplication M3 and a hash value h(M) of a message M to which the electronic signature is to be attached, performs multiplication M5 of a result of the addition M4 and an inverse number $k^{-1}$ of the random number k generated by the random number generation logic, and uses a result of the multiplication M5 as the result of the computation C'.

2. The signature generation apparatus according to claim 1, wherein the random number generation logic generates a random number r separately from the random number k, and the first calculation logic uses the random number r generated by the random number generation logic, as the new private information r.

3. The signature generation apparatus according to claim 1, wherein the first calculation logic uses at least a part of either the x coordinate value or a y coordinate value of the scalar product P calculated by the input logic, as the new private information r.

4. The signature generation apparatus according to claim 1, wherein the first calculation logic uses a value obtained during a process of calculating the scalar product P by the input logic, as the new private information r.

5. A signature generation method for generating an electronic signature obtainable by calculating a remainder modulo public information n for a result of computation C which includes multiplication of public information e and private information d, the signature generation method comprising:

inputting the public information e and n;

reading the private information d from a memory device which beforehand stores the private information d;

performing, using a hardware processing device, multiplication M1 of new private information r and the inputted public information n;

performing, using the hardware processing device, addition M2 of a result of the multiplication M1 and the inputted public information e;

generating the electronic signature by performing as the computation C, using the hardware processing device, computation C' which includes multiplication of a result of the addition M2 and the read private information d, and calculating, using the hardware processing device, a remainder modulo the inputted public information n for a result of the computation C';

generating, using the hardware processing device, a random number k, wherein the electronic signature is an ECDSA (Elliptic Curve Digital Signature Algorithm) signature;

calculating a scalar product P of the random number k and a generator G on an elliptic curve, and inputting an x coordinate value of the scalar product P as the public information e, and performing multiplication M3 of the result of the addition M2 and the private information d;

performing addition M4 of a result of the multiplication M3 and a hash value h(M) of a message M to which the electronic signature is to be attached;

performing multiplication M5 of a result of the addition M4 and an inverse number $k^{-1}$ of the random number k; and using a result of the multiplication M5 as the result of the computation C'.

6. A non-transitory computer readable storage medium storing a program that causes a computer, which generates an electronic signature obtainable by calculating a remainder modulo public information n for a result of computation C which includes multiplication of public information e and private information d, to function as:

an input logic configured to input the public information e and n;

a read logic configured to read the private information d from a memory device which beforehand stores the private information d;

a first calculation logic configured to perform, using a hardware processing device, multiplication M1 of new private information r and the public information n inputted by the input logic;

a second calculation logic configured to perform, using the hardware processing device, addition M2 of a result of the multiplication M1 performed by the first calculation logic and the public information e inputted by the input logic;

a signature generation logic configured to generate the electronic signature by performing as the computation C, using the hardware processing device, computation C' which includes multiplication of a result of the addition M2 performed by the second calculation logic and the private information d read by the read logic, and calculating, using the hardware processing device, a remainder modulo the public information n inputted by the input logic for a result of the computation C'; and a random number generation logic configured to generate, using the processing device, a random number k, wherein the electronic signature is an ECDSA (Elliptic Curve Digital Signature Algorithm) signature, the input logic calculates a scalar product P of the random number k generated by the random number generation logic and a generator G on an elliptic curve, and inputs an x coordinate value of the scalar product P as the public information e, and the signature generation logic performs multiplication M3 of the result of the addition M2 performed by the second calculation logic and the private information d read by the read logic, performs addition M4 of a result of the multiplication M3 and a hash value h(M) of a message M to which the electronic signature is to be attached, performs multiplication M5 of a result of the addition M4 and an inverse number $k^{-1}$ of the random number k generated by the random number generation logic, and uses a result of the multiplication M5 as the result of the computation C'.

* * * * *